UNITED STATES PATENT OFFICE.

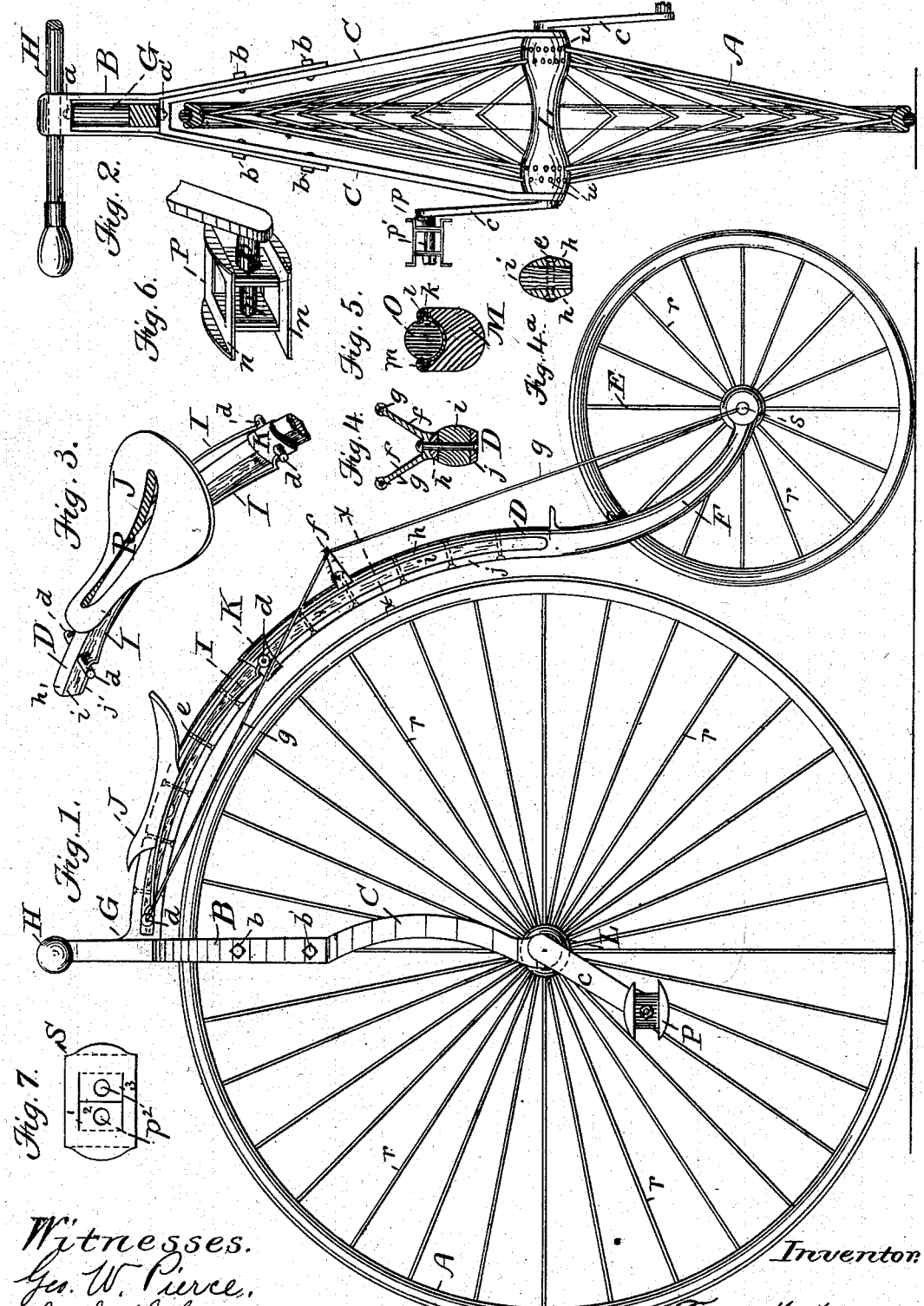

FRED W. BACON, OF BOSTON, MASSACHUSETTS, ASSIGNOR OF ONE-HALF TO CALEB W. HODGDON, OF SAME PLACE.

BICYCLE.

SPECIFICATION forming part of Letters Patent No. 249,447, dated November 15, 1881.

Application filed June 24, 1881. (No model.)

*To all whom it may concern:*

Be it known that I, FRED W. BACON, of Boston, in the county of Suffolk and State of Massachusetts, have invented a new and useful Improvement in Bicycles, of which the following is a description, reference being had to the drawings accompanying and forming part of this specification.

This invention relates to certain improvements in bicycles, for the purpose of obtaining strength, lightness, steadiness, compactness, and cheapness and simplicity of construction; and to these ends it consists, first, in constructing the beam of wood and metal in the manner hereinafter more fully set forth; second, in making the fork and guiding-head separate, and in connecting them in such a manner that they are adjustable one upon the other; third, in supporting the saddle by springs arranged on each side of the beam, and providing said saddle with a central opening, whereby the saddle is enabled to be brought nearer the wheel than in bicycles of the ordinary construction, so that a wheel of large diameter can be made use of without rendering the bicycle too lofty to be conveniently used; fourth, in the provision of a side truss attached to the beam for strengthening the same; fifth, in the construction of the main or propelling wheel; sixth, in a pedal made of thin metallic plates secured together by the crank-pin; and, lastly, in the use of a corrugated or grooved tire for the wheels.

In the accompanying drawings, Figure 1 is a view in elevation of a bicycle embodying and containing these improvements. Fig. 2 is a front view, in elevation, of the same. Fig. 3 is a view of the saddle in perspective. Figs. 4 and 4ª are sectional views of the beam. Fig. 5 is a sectional view of the felly and tire of the wheel. Fig. 6 is a view in perspective of the pedal; and Fig. 7 is a view of one of the plates of the pedal, showing the manner in which it is constructed.

In the several figures the same letters refer to the same parts.

Referring to the drawings, A is the main or propelling wheel, which is made of wood and has its spokes *r r r r* near each end of the hub L and set bracing or double-dished to the rim. The spokes are also "staggered," or set in a zigzag course around the hub, so that no two consecutive spokes are braced in the same direction. This wheel is hung in the fork C, which is made of metal, in one piece, straight or curved.

B is the guiding-head, to which the handle is secured, and this guiding-head is provided with extensions, which are secured on each side of the fork by bolts *b b*, which may pass through slots and be secured by nuts, thus affording means for the adjustment of the guiding-head on the fork, and obviating the necessity of the adjusting screws and nuts on the neck generally used. The neck G of the beam has its upper bearing, *a*, in the guiding-head B, under the handle, and its lower bearing, *a'*, in the top of the fork C. The main part of the beam is made of wood, as shown at *i*, but is strengthened by metallic plates *h h*, which extend its entire length on the upper and lower sides, or on the sides, and which plates are secured to the wood by rivets. At their lower ends the plates are welded to a metallic bar, F, which is forked for the reception of the steering-wheel E in suitable bearings, *s s*, and at their upper ends these plates are riveted or welded to the neck G.

J is the saddle, which is provided with a central longitudinal opening, R, similar to that on the McLellan saddle, and is clamped to two flat springs, I I, one on each side of the beam. These springs are secured at their upper ends to pins *d d*, projecting from the beam, and at their lower ends they are secured to pins which project from a curved plate or clip, K, which fits over the beam and slides on the same. Owing to the opening in the saddle and the manner of supporting the same, it will, when occupied, be brought nearly to the rim of the wheel, and thus a wheel of large diameter can be used, and at the same time the saddle is not too far from the ground to prevent the bicycle from being easily mounted.

I do not confine myself to the use of flat springs; but any other suitable arrangement of springs can be used for supporting the saddle whereby it is enabled to be brought down on each side of the beam.

The felly M of the wheels is made of wood, and is provided with a central groove. Over this fits a thin metal tire, $k$, formed with a bead to fit the groove, and two half-round or oval tires, one on each side, prevent the wheel from sliding sidewise while rolling on uneven or hard ground. A rubber tire, O, may be put on the rim between these tires. This rubber tire may be made from a single piece.

The cranks $c$ are attached in the usual manner to the driving-shaft. The pedals P may be made of thin sheet metal, or may be cast in the proper form and revolve on the crank-spindle $p$, and are secured by a nut at each end. Each of the footholds is the duplicate of the other, and a convenient manner of constructing the pedal is shown in Figs. 6 and 7. This consists in making three incisions in a plate of metal, as shown at 1, 2, 3 in Fig. 7, and then bending down the part included by the lines of incision, and connecting two such plates superimposed one upon the other in a reverse position by means of the pin, as shown in Fig. 6.

The trusses $g$, which are used to strengthen the beam and give steadiness to the operation of the bicycle, consist of two metallic rods, $g$ $g$, one on each side of the beam, which extend from the hub of the small wheel to a point on the beam between the saddle and the small fork and from thence to a point near the neck.

I claim—

1. The combination, in a bicycle, of a beam extending over the wheel, fork C, straddling the wheel, and forked guiding-head B, connected adjustably to the fork, as described, whereby the two parts may be adjusted one upon the other, substantially as and for the purpose set forth.

2. The saddle J, constructed as described, set with its sides extending down on either side of the beam, and provided with a longitudinal opening for the reception of the beam.

3. The combination, with the beam D, of the saddle J, constructed and set down with its sides overlapping the sides of the beam, as described, and springs on each side of the beam and supporting the saddle below the top of the beam, substantially as and for the purpose set forth.

4. In combination with the beam D, the flat springs I I, arranged on each side of and below the top of the same, secured in front and behind the saddle and supporting the same, substantially as and for the purpose set forth.

5. The combination of the beam, saddle, side springs, and slide K, substantially as described.

6. A pedal composed of duplicate metallic plates P P, connected by the crank-pin and constructed as described, whereby the nuts which secure the pedal to the crank-pin are shielded by the foot-rest, substantially as and for the purpose set forth.

7. In a bicycle, the combination, with the beam, of the supporting-trusses, one on each side of the beam, and extending from near the lower extremity of the lower fork to a point between the saddle and the lower fork and from thence to a point near the neck, substantially as and for the purpose set forth.

8. The combination, with a felly and rubber tire, of an intermediate grooved plate and retaining devices secured to the intermediate plate, substantially as and for the purpose set forth.

In witness whereof I have hereto set my hand in presence of the two subscribing witnesses.

FRED W. BACON.

Witnesses:
EDWIN D. STICKNEY,
ALEX. L. HAYES.